US012595899B2

(12) United States Patent
Liao et al.

(10) Patent No.: US 12,595,899 B2
(45) Date of Patent: Apr. 7, 2026

(54) MOBILE LUMINAIRE

(71) Applicant: LEDVANCE GmbH, Garching bei München (DE)

(72) Inventors: Wuqiang Liao, Shenzhen (CN); Heng Li, Shenzhen (CN); Wang Jiang, Shenzhen (CN)

(73) Assignee: LEDVANCE GMBH, Garching Bei Munchen (DE)

( * ) Notice: Subject to any disclaimer, the term of this patent is extended or adjusted under 35 U.S.C. 154(b) by 0 days.

(21) Appl. No.: 19/058,683

(22) Filed: Feb. 20, 2025

(65) Prior Publication Data

US 2025/0271123 A1 Aug. 28, 2025

(30) Foreign Application Priority Data

Feb. 23, 2024 (CN) ......................... 202410202234.8

(51) Int. Cl.
*F21V 21/08* (2006.01)
*F21V 23/04* (2006.01)

(52) U.S. Cl.
CPC .......... *F21V 21/08* (2013.01); *F21V 23/0471* (2013.01)

(58) Field of Classification Search
CPC ............................ F21V 21/08; F21V 23/0471
See application file for complete search history.

(56) References Cited

U.S. PATENT DOCUMENTS

| | | | | |
|---|---|---|---|---|
| 11,310,876 | B2 * | 4/2022 | Bosua | H05B 45/00 |
| 12,363,814 | B1 * | 7/2025 | Tseng | F21V 23/005 |
| 2017/0184260 | A1 * | 6/2017 | Munoz Abogabir | F21V 23/023 |
| 2019/0132928 | A1 * | 5/2019 | Rodinger | F21V 23/06 |
| 2023/0031367 | A1 * | 2/2023 | Li | H05B 47/19 |
| 2024/0302011 | A1 * | 9/2024 | Wang | F21S 9/02 |

* cited by examiner

*Primary Examiner* — Christopher E Dunay
(74) *Attorney, Agent, or Firm* — Hayes Soloway PC

(57) ABSTRACT

A mobile luminaire is provided. The mobile luminaire includes one or more light sources for generating light having at least one adjustable light parameter, a driver for driving at least one light source, and a control module for controlling the driver, wherein the mobile luminaire includes a motion detection system for capturing movement of the mobile luminaire. The motion detection system is operatively connected to the control module, and wherein the control module is configured to control at least one light source at least partially based on the movement captured by the motion detection system.

20 Claims, 6 Drawing Sheets

1

MOBILE LUMINAIRE

CROSS-REFERENCE TO RELATED APPLICATIONS

This patent application claims the benefit of and priority to Chinese Patent Application No. 202410202234.8, filed on Feb. 23, 2024, which is herein incorporated by reference in its entirety.

FIELD OF THE DISCLOSURE

The present application generally relates to luminaires. Specifically, the present disclosure relates to a mobile luminaire/mobile lighting device.

BACKGROUND

Luminaires with adjustable light parameters (for example, light-emitting diode (LED) luminaires) are known. In addition, luminaires are also known that are controllable via mobile applications or computers, such as through wireless or wired communication or physical buttons. However, it is typically difficult to achieve a balance between professionalism and operability, resulting in reduced user enjoyment. For example, for computer-controlled luminaires or app-controlled luminaires, additional devices, components, or even entire systems are required to perform control operations, making such systems particularly unfriendly to users, especially for many simple applications. Luminaires controllable through gestures or voice are also known. However, gesture control and voice control suffer from poor recognition and are prone to misinterpreting user intentions.

SUMMARY

The objective of the present application is to provide a luminaire that can be easily and intuitively controlled and can provide an improved user experience.

To address the above problems, a mobile or portable luminaire is provided. The mobile luminaire includes one or more light sources having at least one adjustable light parameter. Specifically, the mobile luminaire may include multiple tunable light sources to provide combined light effects.

The mobile luminaire also includes a driver for driving at least one light source. The driver may include single-channel and/or multi-channel driver modules for driving at least one light source. The mobile luminaire also includes a control module or controller for controlling the driver. The control module may include one or more lighting control modules for controlling the state of at least one light source specifically by controlling the driver accordingly.

The mobile luminaire also includes a motion detection system for capturing movement of the mobile luminaire, the motion detection system being operatively connected to the control module. The motion detection system may specifically include one or more sensors configured to capture translational movement, rotational movement and/or orientation of the mobile luminaire. Specifically, the motion detection system may include one or more gyroscopes, accelerometers, and/or one or more additional sensors designed to detect orientation and movement of the mobile luminaire.

The control module is configured to control at least one light source at least partially based on the movement captured by the motion detection system.

Specifically, the control module may be configured to control the light output of at least one light source by controlling the driver accordingly at least partially based on the movement captured by the motion detection system. The control module may specifically be configured to capture the current state of the mobile luminaire, for example, the current operating or lighting state, and adjust the light output of at least one light source at least partially based on the current state of the luminaire. Specifically, depending on the current state and the movement captured by the motion detection system, the control module may switch the mobile luminaire on or off, initiate or stop a color cycling mechanism, adjust the correlated color temperature (CCT) and/or brightness of the output light.

The mobile luminaire is particularly comfortable and user-friendly because it can be controlled by simply moving the mobile luminaire without requiring additional devices to control the light output. Thus, simply by moving the mobile luminaire, users can provide interactive feedback to adjust the light output, thereby improving usability and user enjoyment. Therefore, the mobile luminaire represents a simple, installation-free, and game-controllable lighting device with enhanced user experience.

The motion detection system may be configured to capture information regarding direction, angle, and/or speed of movement of the mobile luminaire, wherein the control module may be configured to control at least one light source at least partially based on information regarding direction, movement angle, movement speed, and/or direction change speed of the mobile luminaire captured by the motion detection system. Thus, users can easily adjust or control the light output by moving the mobile luminaire in different directions, at different speeds, and/or at different angles.

In some embodiments, capturing movement includes capturing movement patterns of the movement of the mobile luminaire, such as trajectory and/or rotation patterns. Thus, users can easily adjust or control the light output by moving the luminaire in different patterns or along different trajectories.

The mobile luminaire may be a configurable luminaire with variable lighting configuration. This allows lighting curve adjustment and gesture-specific custom configurations. For example, the change of light configuration may include: selecting a human-centric lighting (HCL) curve from a collection of HCL curves stored in a memory unit of the control module according to user preferences, representing time dependency of light parameters.

In some embodiments, the mobile luminaire includes one or more built-in configuration modules for changing the lighting configuration at least partially based on movement captured by the motion detection system.

Alternatively or additionally, the mobile luminaire may include one or more external configuration modules for changing the lighting configuration at least partially based on input received from an external input device. The external input device may be a server, personal computer, or any mobile device with a suitable user interface. The external device may be wirelessly connected to the mobile luminaire, for example based on Bluetooth or other protocols, and/or connected by wire through a corresponding interface of the mobile luminaire.

The mobile luminaire may be configured as a detachably and/or movably mountable luminaire. Specifically, according to user wishes, the luminaire can be attached to or detached from a mounting surface. Furthermore, the luminaire may be movable in the mounted state, that is, even without detaching the luminaire from the mounting surface. Thus, the luminaire can be operated even without changing its position.

In some embodiments, the mobile luminaire includes a mounting base configured for mounting the mobile luminaire on a substantially flat mounting surface. The mounting surface can in principle be any suitable surface at any location where it is desired to place the mobile luminaire. The mounting surface can be, for example, a wall surface or ceiling surface, a bottom surface of a shelf or cabinet, or any interior surface of a cabinet (such as a wardrobe or closet).

The mounting base may include magnetic material or magnets for magnetically attaching the mobile luminaire to the mounting surface. Due to the magnetic material in the mounting base or magnetic base, the mobile luminaire can be easily (specifically tool-free) attached to metal supports or mounting surfaces of supports including magnetic material (specifically ferromagnetic material). In some embodiments, the mobile luminaire may include a detachable magnetic plate and/or adhesive film for mounting the mobile luminaire on the mounting surface. Due to the magnetic plate and/or tape, the mobile luminaire can also be easily mounted to any non-magnetic support.

In some embodiments, the mobile luminaire includes a power supply unit, specifically having a rechargeable battery, for autonomous power supply of the mobile luminaire. Due to the autonomous power supply, the mobile luminaire can be installed even in places without direct access to the power grid. The mobile luminaire may include a power port and/or inductive charging port for connecting the mobile luminaire to an external power source. In some embodiments, a USB-C or USB Type-C compact port is used as the power port. The autonomous power supply can be charged when necessary by connecting the power port to an external power source.

In some embodiments, the mobile luminaire includes a communication interface for receiving user commands, and the control module may be configured to control the driver at least partially based on user commands received via the communication interface. Specifically, the control module may be configured such that at least one light parameter is adjusted according to user commands received via the communication interface.

The communication interface may be configured for wireless communication with a communication interface of a mobile or smart device having a user interface, such that the control module can be configured at least partially based on user input received via the user interface of the mobile device. Specifically, the control module may be configured such that settings of the mobile luminaire (such as preset light scenes) can be modified by the user using a proprietary application installed on the mobile device.

In the following description, details are provided to describe embodiments of the present specification. However, it will be apparent to those skilled in the art that embodiments can be practiced without these details.

Some parts of the embodiments have similar parts. Similar parts may have the same name or similar part numbers. Where appropriate, the description of one part applies by reference to another similar part, thereby reducing text repetition without limiting the disclosure.

DETAILED DESCRIPTION

Figure 1:
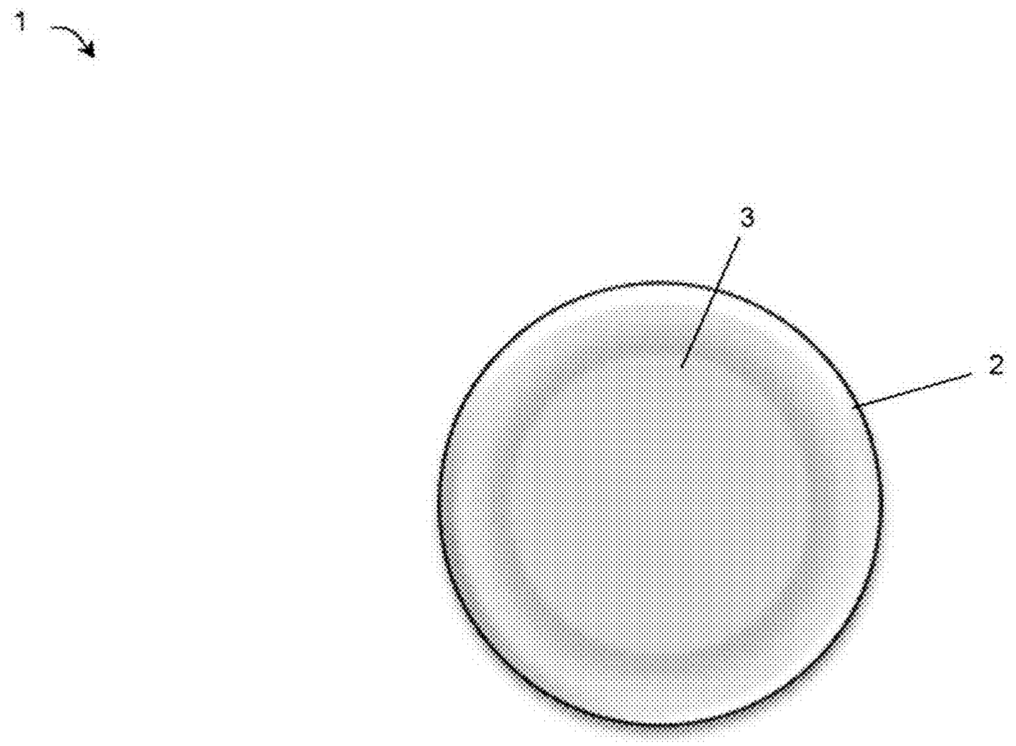
FIG. 1 shows a schematic front view of a mobile luminaire according to an embodiment.

FIG. 1 shows a schematic front view of a mobile luminaire 1 according to an embodiment. In the illustrated embodiment, the mobile luminaire 1 includes a substantially disc-shaped housing 2 with a translucent optical cover 3, and light sources 20 arranged within the housing 2 behind the translucent optical cover 3. The mobile luminaire 1 includes a motion detection system 22, a driver 21 for driving the light sources 20, a control module 30 for controlling the light output of the light sources 20, and a power supply unit 40 or battery for autonomous power supply of the mobile luminaire 1. These components are not shown in FIG. 1.

Figure 2:
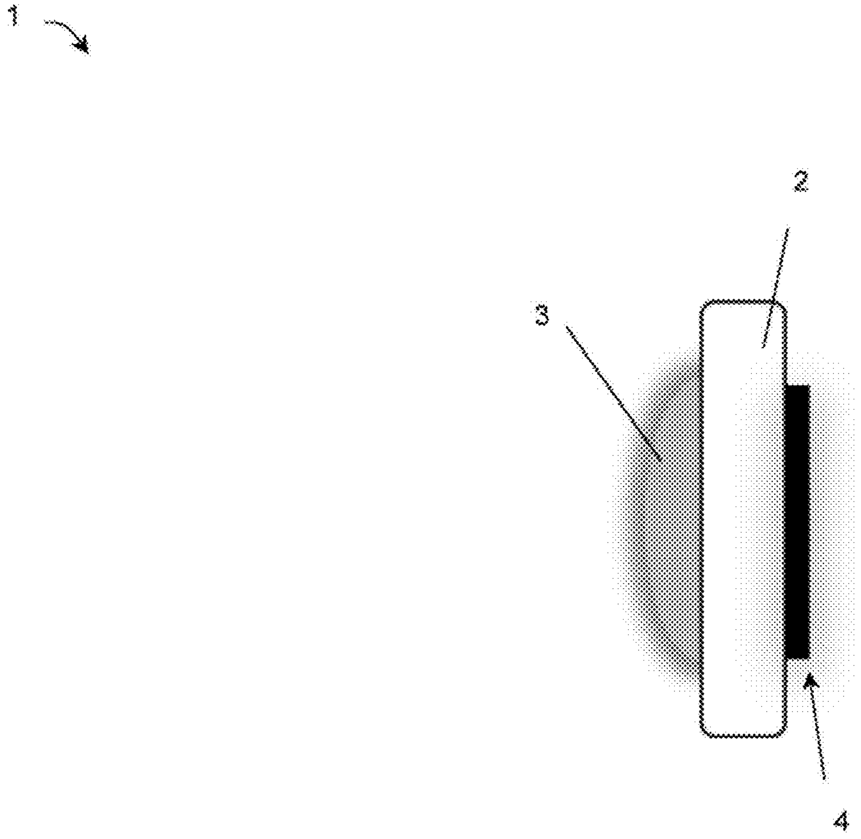
FIG. 2 shows a schematic side view of the mobile luminaire according to FIG. 1.

FIG. 2 shows a schematic side view of the mobile luminaire 1 according to FIG. 1. As seen from the side view of FIG. 2, the mobile luminaire 1 has a flat bottom of a mounting base 4 opposite to the translucent optical cover 3, and the translucent optical cover 3 has a dome-shaped configuration with a convex profile. The mounting base 4 may include magnetic material or magnets and/or adhesive for mounting the mobile luminaire 1 on a substantially flat surface.

Figure 3:
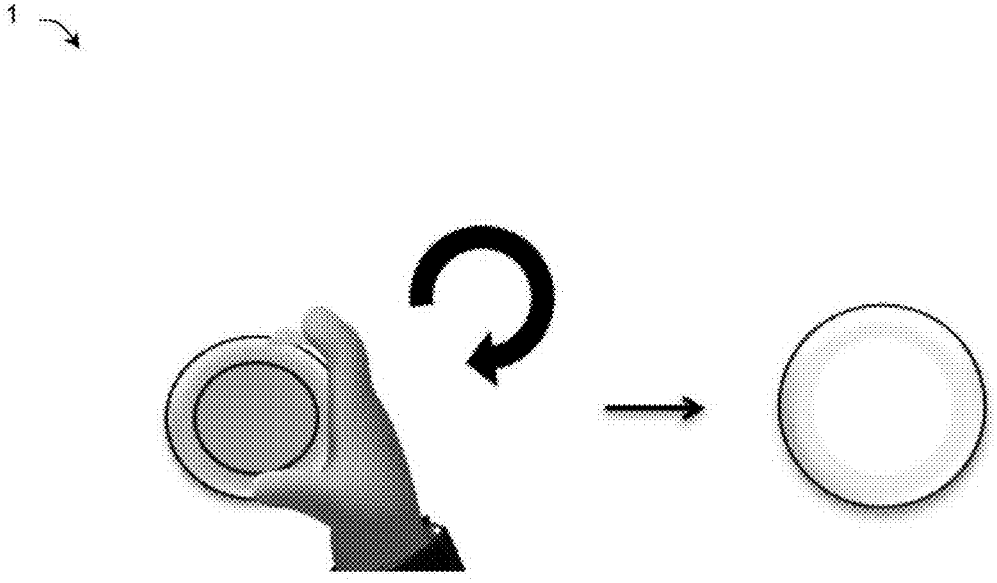
FIG. 3 shows operation of a mobile luminaire according to an embodiment.

FIG. 3 shows operation of a mobile luminaire 1 according to an embodiment. Specifically, FIG. 3 shows the mobile luminaire 1 that can be fixed to a mounting surface using magnet such that it can be moved or rotated by a user. In this illustrative example, a rotational movement indicated by the circular arrow caused by the user's hand (shown on the left side of FIG. 3) is detected by the motion detection system 22, and the light sources 20 are switched on by the control module 30 (shown on the right side of FIG. 3). Basically, it can be any other movement, such as combinations of translational movement and/or rotational movement and/or shaking, which can be used by the user to control the mobile luminaire 1.

Figure 4:
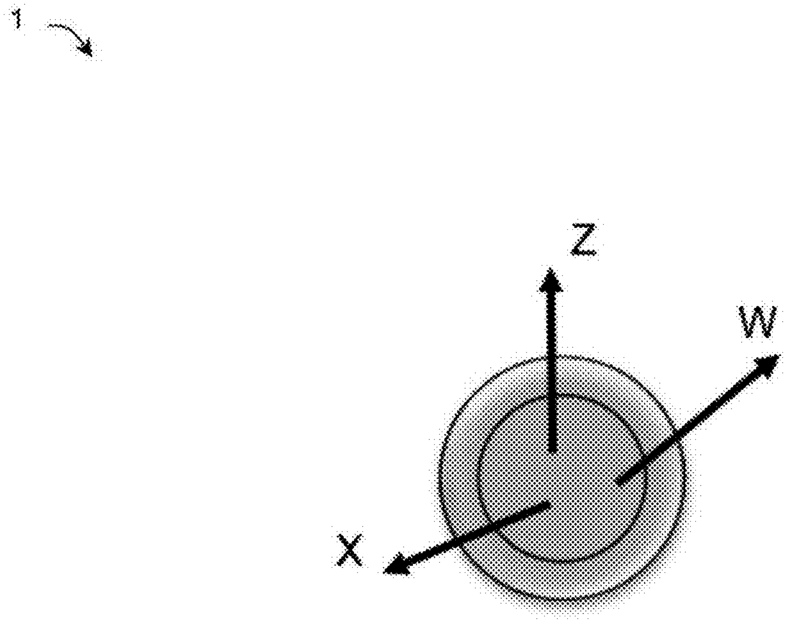
FIG. 4 shows some translational movements that can be used to control the mobile luminaire.

FIG. 4 shows some translational movements that can be used to control the mobile luminaire 1. Specifically, FIG. 4 shows a top view of the mobile luminaire 1 according to an embodiment, where arrows X, Z, and W respectively represent horizontal movement (arrow X), vertical movement (arrow Z), and inclining movement (arrow W). In some embodiments, the motion detection system 22 may be configured to capture such translational movements of the mobile luminaire 1, and the control module 30 may be configured to control or adjust the light output of the mobile luminaire 1 accordingly. Specifically, the controller may be configured to interpret the captured translational movements as user commands for controlling the light output of the mobile luminaire 1.

Figure 5:
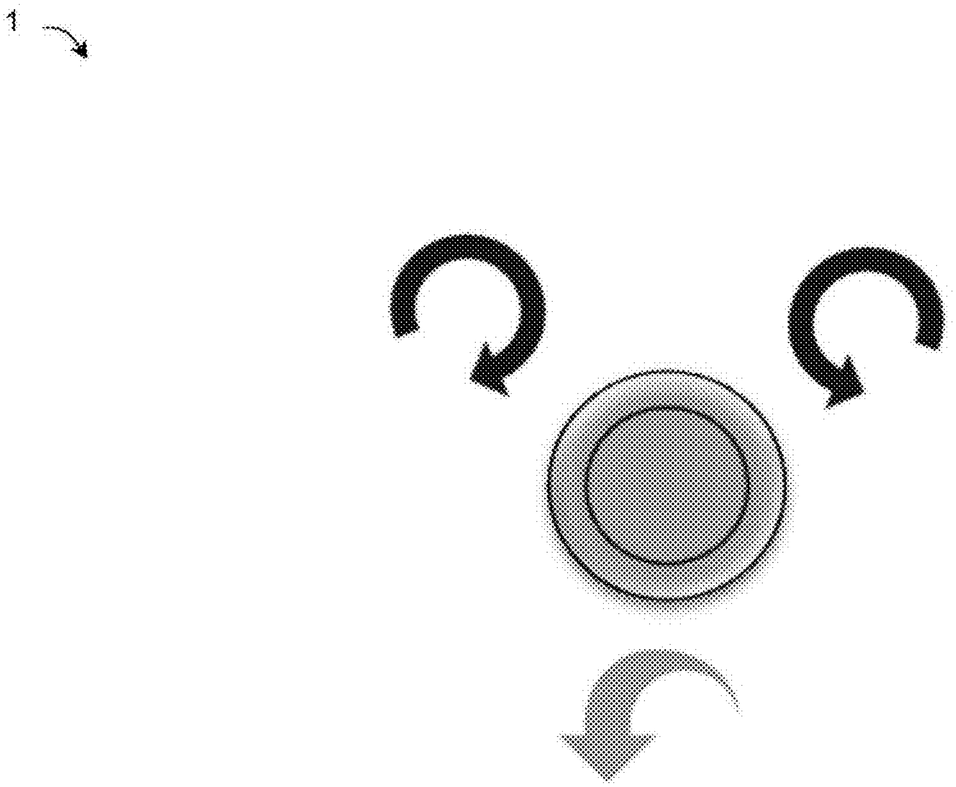
FIG. 5 shows some rotational movements that can be used to control the mobile luminaire.

FIG. 5 shows some rotational movements that can be used to control the mobile luminaire 1. Specifically, FIG. 5 shows a top view of the mobile luminaire 1 according to an embodiment, where rotational circular arrows indicate rotational movements of the mobile luminaire 1.

Specifically, the mobile luminaire 1 can be rotated clockwise, as indicated by the circular arrow in the upper left corner of FIG. 5, or counterclockwise, as indicated by the circular arrow in the upper right corner of FIG. 5. The mobile luminaire 1 can also be rotated in alternating directions, for example to perform a trigger rotation, as indicated by the arrows at the bottom of FIG. 5.

The motion detection system 22 may be configured to capture such rotational movements and/or trigger movements of the mobile luminaire 1, and the control module 30 may be configured to control or adjust the light output of the mobile luminaire 1 accordingly. Specifically, the controller may be configured to interpret the captured rotational movements as user commands for controlling the light output of the mobile luminaire 1.

In some embodiments, the controller is configured to control the light output of the mobile luminaire 1 at least partially based on the direction, speed, and/or rhythm of translational movements and/or rotational movements.

Specifically, the direction, speed, and/or rhythm of translational movements and/or rotational movements can be interpreted by the control module 30 as commands for, for example, adjusting illumination level, switching lights on/off, adjusting CCT, changing lighting scenes or color cycling, starting/stopping animations, etc.

Figure 6:
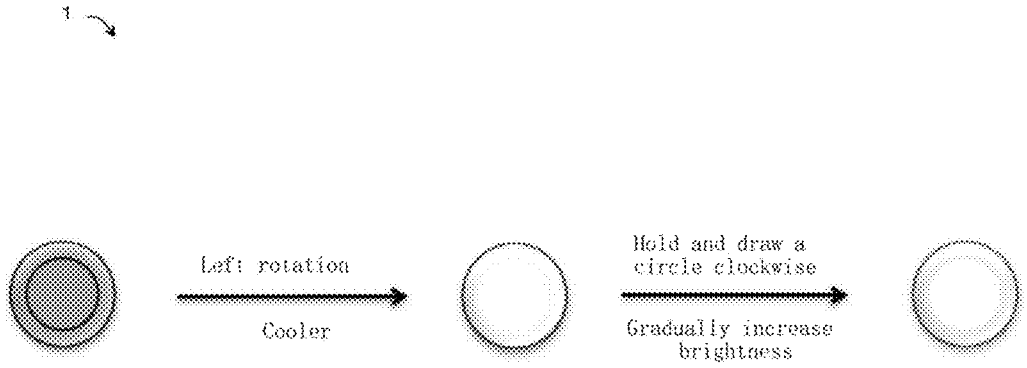
FIG. 6 shows an exemplary implementation of motion control according to an embodiment.

FIG. 6 shows an exemplary implementation of motion control according to an embodiment. In the exemplary implementation of FIG. 6, three different lighting states of the mobile luminaire 1 are shown. In the leftmost position in FIG. 6, the mobile luminaire 1 is in an initial state, for example, generating light with a specific color temperature. Later, a left rotation of the mobile luminaire 1 is performed by the user. The left rotation is detected by the motion detection system 22. The control module 30 interprets the left rotation as a command to decrease the colder temperature, for example based on a lookup table stored in a memory unit 32 of the control module 30, thereby bringing the mobile luminaire 1 into a second state (middle of FIG. 6) in which the mobile luminaire 1 generates colder light. After that, the user holds the mobile luminaire 1 and draws a circle clockwise, which is detected by the motion detection system 22. The control module 30 interprets the circular movement as a command to gradually increase the brightness of the output light of the mobile luminaire 1, for example based on a lookup table stored in the memory unit 32 of the control module 30, leading to a third state (rightmost state in FIG. 6). The transitions from the first state to the second state and from the second state to the third state are indicated by horizontal arrows.

Figure 7:
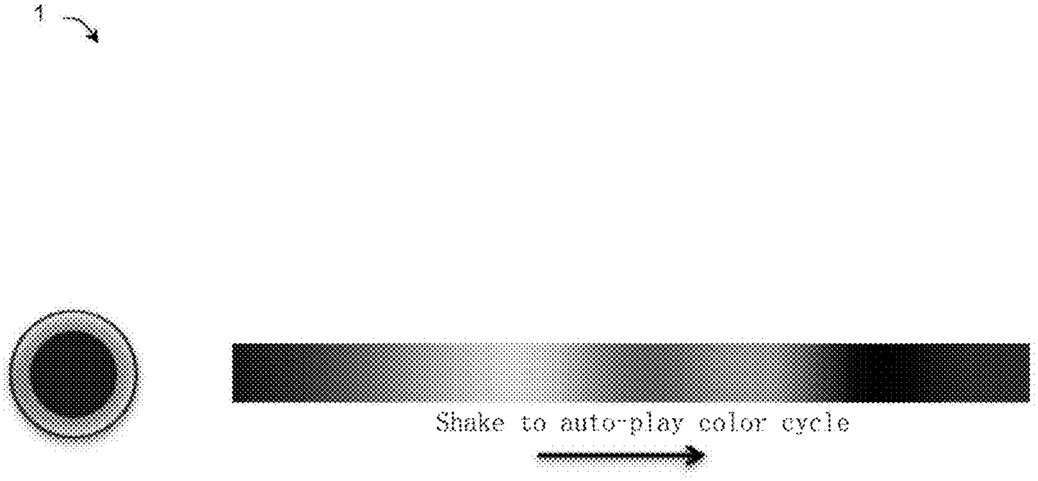
FIG. 7 shows another exemplary implementation of motion control according to an embodiment.

FIG. 7 shows an exemplary implementation of motion control according to an embodiment. In the exemplary implementation of FIG. 7, the mobile luminaire 1 is in a first state, for example, generating light with a first spectral characteristic, after which the mobile luminaire 1 is shaken systematically and interpreted by the control module 30 as a command to run a color cycle. Thereupon, the control module 30 transitions the mobile luminaire 1 from the first state (left side of FIG. 7) into a color cycle state (right side of FIG. 7). In the color cycle mode, the spectral characteristics of the light are steadily changed such that the color of the light gradually changes. The transition from the first state to the second (color cycle) state is indicated by a horizontal arrow.

Figure 8:
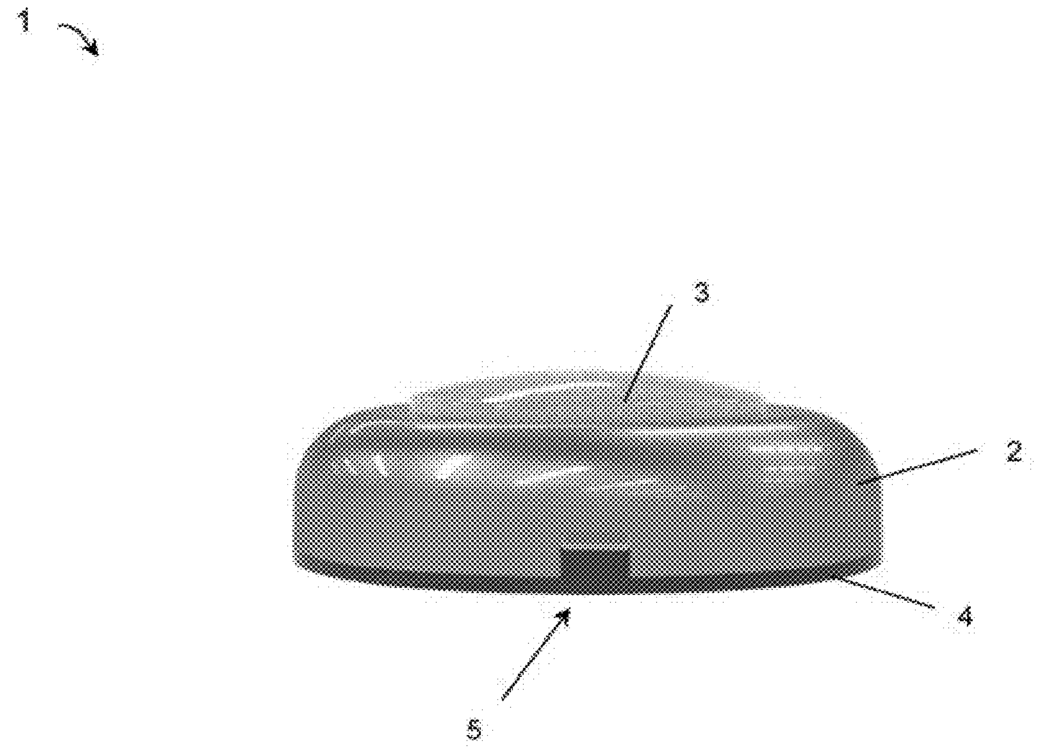
FIG. 8 shows a side view of a mobile luminaire according to an embodiment.

FIG. 8 shows a side view of a mobile luminaire 1 according to an embodiment. In the illustrated embodiment, the mobile luminaire 1 includes a power port 5 in the lower part of the housing 2.

In some embodiments, the translucent optical cover 3 is configured as a button that can be manually operated by a user. Specifically, by pressing downward toward the mounting base 4, for example, the translucent optical cover 3 can be deformed or displaced such that at least one mechanical switch (not shown) can be activated, the at least one mechanical switch can be recorded by the control module 30 as user input to the control module 30. Thus, pushing the translucent optical cover 3 can serve as an additional input, particularly an additional input to motion control, for controlling the mobile luminaire 1.

The mobile luminaire 1 may include a printed circuit board (PCB) on which the light engine is mounted. The light engine may include multiple LEDs mounted on the PCB. In some embodiments, the light engine includes one or more red, green, blue, and/or white LEDs with different color temperatures.

By combining light produced by red, green, and white LEDs in different ratios, light with different colors and/or white light with different color temperatures can be produced.

The mobile luminaire 1 may include a power supply unit 40 with a rechargeable battery. The power supply unit 40 may be connected to the power port 5 such that the rechargeable battery of the power supply unit 40 can be charged by connecting the mobile luminaire 1 to an external power source using the power port 5.

Tape 17 may be provided on the bottom side of the mounting base 4 for attaching the mounting base 4 and/or magnetic plate 18 (not shown) to the mounting surface. In some embodiments, the tape 17 is double-sided tape with non-adhesive removable foil on one or both sides of the tape 17. In some embodiments, the non-adhesive removable foil is provided on one side of the tape 17, with the other side of the tape 17 attached to the magnetic plate 18.

Figure 9:
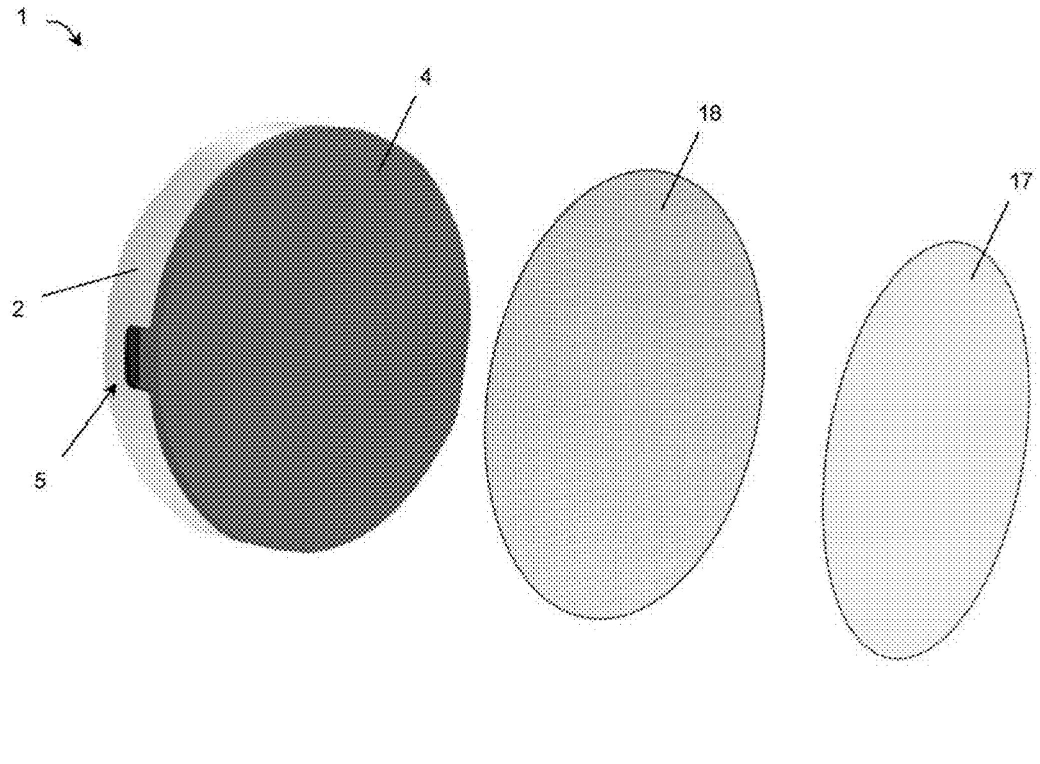
FIG. 9 shows an exploded perspective view of a mobile luminaire according to an embodiment.

FIG. 9 shows an exploded perspective view of a mobile luminaire 1 according to an embodiment. Specifically, for greater clarity, FIG. 9 shows the tape 17 and magnetic plate 18 in a separated state. In some embodiments, a 3M-brand tape is used.

Figure 10:
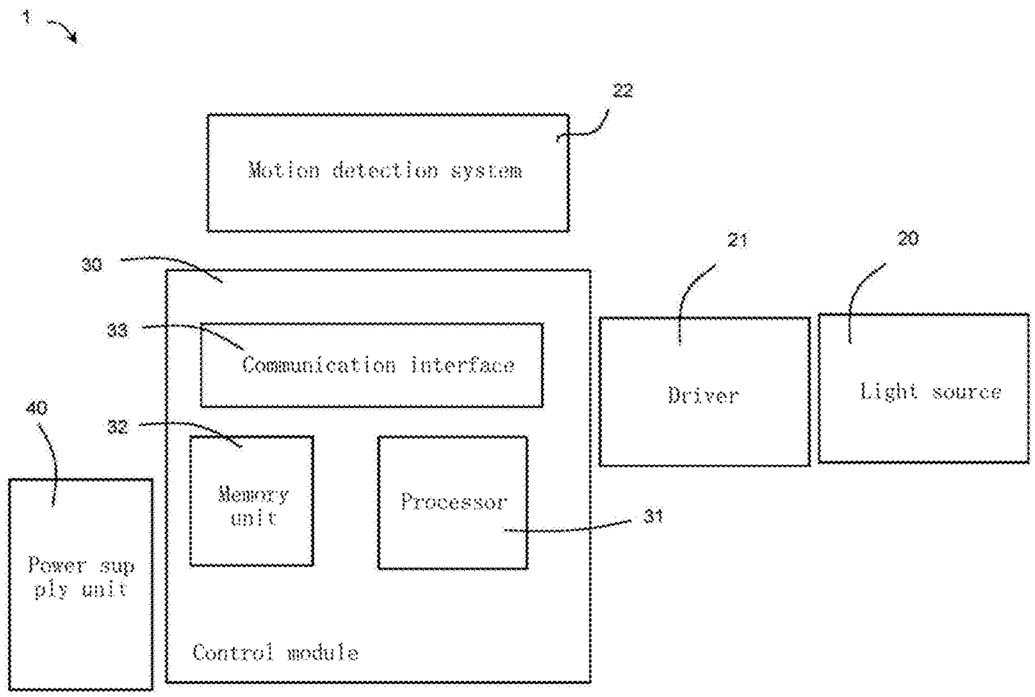
FIG. 10 shows a schematic block diagram of a mobile luminaire according to an embodiment.

FIG. 10 shows a schematic block diagram of a mobile luminaire 1 according to an embodiment. In the embodiment of FIG. 10, the mobile luminaire 1 includes tunable light sources 20, which may include multiple light sources with adjustable light parameters. The mobile luminaire 1 also includes a driver 21 for driving the light sources 20. In some embodiments, the driver 21 is a multi-channel driver for driving individual light sources (such as LED light sources of different colors, for example, red, green, blue, and white LEDs) to generate combined light with desired spectral characteristics.

The mobile luminaire 1 also includes a motion detection system 22 having one or more sensors for detecting movement of the mobile luminaire 1. The motion detection system 22 may specifically include one or more gyroscopes, accelerometers, and/or one or more additional sensors designed to detect orientation and movement of the mobile luminaire 1.

The mobile luminaire 1 also includes a control module 30, which includes a processor 31, a memory unit 32, and a communication interface 33 for communicating with the motion detection system 22 and with the driver 21 for driving the light sources 20. The mobile luminaire 1 further includes a power supply unit 40 for autonomous power supply of the mobile luminaire 1. The power supply unit 40 may include a rechargeable battery and a power port 5 for connecting the power supply unit 40 to an external power source.

The memory unit 32 is configured to store data and machine-readable instructions for the processor 31 for controlling the driver 21. Specifically, the memory unit 32 may store instructions for the processor 31 to evaluate data received from the motion detection system 22 to interpret movement captured by the motion detection system 22, and to control the light output of the mobile luminaire 1 by controlling the driver 21 at least partially based on the movement captured by the motion detection system 22.

In some embodiments, the memory unit 32 may contain instructions for the processor 31 to identify movement patterns based on movement captured by the motion detection system 22. Furthermore, the memory unit 32 may contain at least one lookup table that assigns movements or movement patterns to instructions for the processor 31 to control the driver 21, such that the light sources 20 can be controlled based on movements or movement patterns identified by the processor 31.

In some embodiments, the mobile luminaire 1 includes one or more lighting configuration modules that can be part of the control module 30 or separate modules. The lighting configuration modules may be configured to change the lighting or operating configuration of the mobile luminaire 1 at least partially based on movement captured by the motion detection system 22.

The mobile luminaire 1 may alternatively or additionally include one or more external configuration modules for configuring the mobile luminaire 1 at least partially based on input received from an external input device. Specifically, more complex operations can be achieved by connecting an external configurator 50. For example, the external configurator 50 can be used to configure shaking actions, switch curves via Bluetooth, customize curves (such as HCL curves) and bind them to custom actions of the device. External configuration can be completed at the factory or provided to users.

Figure 11:
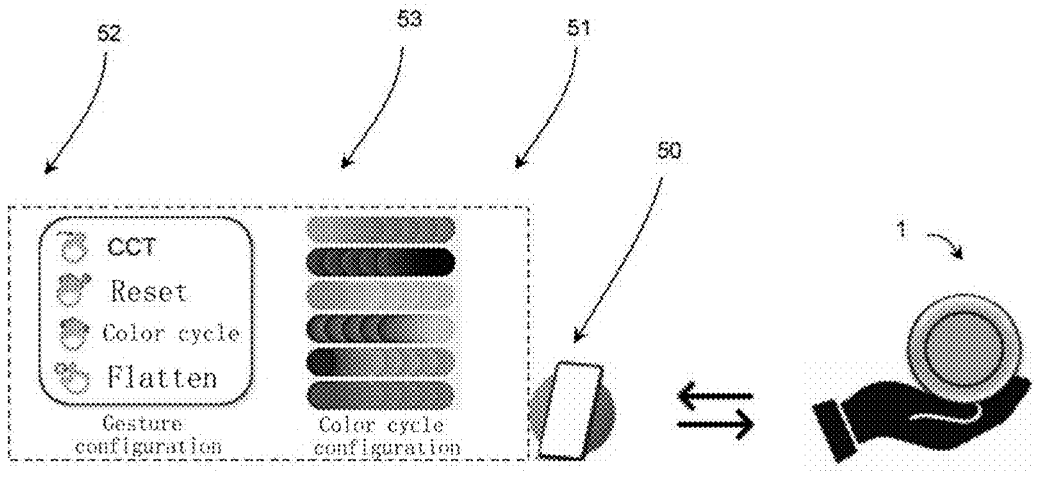
FIG. 11 shows processing of an external configuration according to an embodiment.

FIG. 11 shows processing of external configuration according to an embodiment. Specifically, FIG. 11 shows the mobile luminaire 1 and an external configurator 50 with a user interface menu 51 for performing external configuration of the mobile luminaire 1. In this exemplary embodiment, the user interface 51 includes a gesture configuration field 52 and a color cycle configuration field 53. By touching corresponding icons in the gesture configuration field 52 and color cycle configuration field 53, users can configure the mobile luminaire 1 according to their preferences.

Thus, users can easily change the operating or display state of the mobile luminaire 1 through simple movements, rotations of the device, thereby providing an intuitive operating experience.

Furthermore, operation of the mobile luminaire 1 is easy and direct, eliminating the need for complex steps and reducing the learning curve.

Additionally, the mobile luminaire 1 presented herein requires no permanent installation, allowing users to carry and use it at any time, thus enhancing flexibility and portability. Furthermore, the mobile luminaire 1 allows a high degree of freedom in configuration and customization. Specifically, users have the freedom to configure and customize the device according to their personal needs, meeting different environmental and contextual requirements and providing greater flexibility. This versatility extends to various modes, including cheer LED sticks, toy lighting, night lights, wireless controllers, etc.

Furthermore, the mobile luminaire 1 is characterized by efficient state switching. The device achieves more state switches with fewer buttons and external control devices, improving operational efficiency and reducing complexity. Additionally, this device is characterized by real-time feedback and motion modes, providing a high level of playability. It can be easily extended to other products, such as cheer sticks.

In some embodiments, the mobile luminaire 1 is configured to attach to a mobile body, such as a bicycle, motorcycle, car, skateboard, or other mobile device, such that the mobile luminaire 1 can move indirectly through the movement of the body, which may be the cost of the operator of the body (such as a cyclist, a car driver, etc.). Specifically, the mobile luminaire 1 can be configured as a bicycle headlight, helmet light, fender light, tail light, decorative light, etc. The operating or lighting state of the mobile luminaire 1 can reflect the movement of the body, thereby providing an enhanced user experience. In some embodiments, the mobile luminaire 1 can be configured to indicate vibration, acceleration, deceleration (for example, when pushing the brake) or movement direction changes by changing its operating or lighting state.

Specifically, the mobile luminaire 1 can be used to indicate different driving conditions or road conditions to traffic participants, such as left turn or right turn indication, uphill, downhill modes, speed and mileage, motion intensity (acceleration), road conditions (bumpy, muddy), impact, fall alerts, etc. In some embodiments, the mobile luminaire 1 can be a headlight configured as a smart indicator, for example, configured to project different light spot shapes, different light intensities, etc., through different movements.

While at least one exemplary embodiment has been presented in the foregoing detailed description, it should be understood that there are numerous variations. It should also be understood that the one or more exemplary embodiments are only examples and are not intended to limit the scope, applicability, or configuration of the disclosure in any way. Rather, the foregoing detailed description will provide those skilled in the art with a convenient roadmap for implementing one or more exemplary embodiments.

LIST OF REFERENCE NUMERALS

1 Mobile luminaire
2 Housing
3 Translucent optical cover
4 Mounting base
5 Power port
17 Tape
18 Magnetic plate
20 Light source
21 Driver
22 Motion detection system
30 Control module
31 Processor
32 Memory unit
33 Communication interface
40 Power supply unit
50 External configurator

51 User interface
52 Gesture configuration field
53 Color cycle configuration field
X Horizontal movement
Z Vertical movement
W Inclining movement

What is claimed is:

1. A mobile luminaire comprising:
a housing;
a mounting base coupled with the housing and configured for mounting the mobile luminaire to a mounting surface in a movable manner;
at least one light source configured for generating light having at least one adjustable light parameter;
a driver configured for driving the at least one light source;
a control module configured for controlling the driver; and
a motion detection system configured for capturing translational movement of the mobile luminaire along the mounting surface;
wherein:
the motion detection system is operatively connected with the control module; and
the control module is configured to adjust the at least one adjustable light parameter of the at least one light source at least partially based on the translational movement captured by the motion detection system.

2. The mobile luminaire according to claim 1, wherein:
in being configured for capturing the translational movement of the mobile luminaire along the mounting surface, the motion detection system is configured to capture information regarding at least one of direction, movement angle, movement speed, and direction change speed of the mobile luminaire relative to the mounting surface; and
the control module is configured to adjust the at least one adjustable light parameter of the at least one light source at least partially based on said captured information.

3. The mobile luminaire according to claim 1, wherein the translational movement captured by the motion detection system comprises a pre-defined movement pattern of the mobile luminaire which is associated with adjustment of the at least one adjustable light parameter of the at least one light source.

4. The mobile luminaire according to claim 3, wherein the pre-defined movement pattern comprises a shaking of the mobile luminaire along the mounting surface.

5. The mobile luminaire according to claim 3, wherein the pre-defined movement pattern comprises a curvilinear movement of the mobile luminaire along the mounting surface.

6. The mobile luminaire according to claim 1, wherein the mobile luminaire:
is a configurable luminaire having a variable lighting configuration; and
further comprises a lighting configuration module configured for changing the variable lighting configuration at least partially based on the translational movement captured by the motion detection system.

7. The mobile luminaire according to claim 1, wherein the mobile luminaire:
is a configurable luminaire having a variable lighting configuration; and
further comprises a lighting configuration module configured for changing the variable lighting configuration at least partially based on input received from an input device external to the mobile luminaire.

8. The mobile luminaire according to claim 1, wherein in being configured for mounting the mobile luminaire to the mounting surface in a movable manner, the mounting base comprises a magnetic material or at least one magnet configured for magnetically mounting the mobile luminaire to the mounting surface.

9. The mobile luminaire according to claim 1, wherein the mobile luminaire further comprises a power supply unit configured for autonomous power supply of the mobile luminaire.

10. The mobile luminaire according to claim 1, wherein:
the motion detection system is further configured for capturing rotational movement of the mobile luminaire along the mounting surface; and
the control module is further configured to adjust the at least one adjustable light parameter of the at least one light source at least partially based on the rotational movement captured by the motion detection system.

11. The mobile luminaire according to claim 10, wherein the rotational movement captured by the motion detection system comprises a pre-defined movement pattern of the mobile luminaire which is associated with adjustment of the at least one adjustable light parameter of the at least one light source.

12. The mobile luminaire according to claim 11, wherein the pre-defined movement pattern comprises a plurality of rotations of the mobile luminaire in either a clockwise direction or a counterclockwise direction.

13. The mobile luminaire according to claim 11, wherein the pre-defined movement pattern comprises:
a first rotation in one of either a clockwise direction or a counterclockwise direction; and
a second rotation in the other of either the clockwise direction or the counterclockwise direction.

14. The mobile luminaire according to claim 1, further comprising a translucent optical cover disposed over the at least one light source, wherein:
the translucent optical cover is repeatably depressible relative to the housing; and
the control module is further configured to adjust the at least one adjustable light parameter of the at least one light source at least partially based on the depressing of the translucent optical cover relative to the housing.

15. The mobile luminaire according to claim 1, wherein the motion detection system is further configured to capture movement of the mounting surface in free space.

16. The mobile luminaire according to claim 15, wherein:
the captured movement of the mounting surface in free space corresponds to movement of the mounting surface relative to a second surface over which the mounting surface is traveling; and
the mobile luminaire is configured to interpret a surface characteristic of the second surface and adjust the at least one adjustable light parameter at least partially based thereon.

17. A system comprising:
the mobile luminaire according to claim 1; and
a mounting plate configured to operatively interface with the mobile luminaire and the mounting surface, wherein the mounting plate physically intervenes between the mobile luminaire and the mounting surface.

18. A system comprising:

the mobile luminaire according to claim 1; and a configuration device external to the mobile luminaire and configured to communicate with the mobile luminaire to effectuate adjustment of the at least one adjustable light parameter of the at least one light source at least partially based on input received by the mobile luminaire from the configuration device.

19. The system of claim 18, wherein the configuration device is configured to provide a user interface by which a user can input at least one gesture which is associated with adjustment of the at least one adjustable light parameter of the at least one light source.

20. The system of claim 19, wherein the configuration device comprises a smartphone or other mobile computing device.

* * * * *